United States Patent
Dong et al.

(10) Patent No.: US 10,633,226 B2
(45) Date of Patent: Apr. 28, 2020

(54) FLANGE COVER MOUNTING AND DISMOUNTING DEVICE AND COOLING DEVICE

(71) Applicant: Carrier Corporation, Farmington, CT (US)

(72) Inventors: Keli Dong, Shanghai (CN); Michael A. Stark, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 260 days.

(21) Appl. No.: 15/520,322

(22) PCT Filed: Oct. 21, 2015

(86) PCT No.: PCT/US2015/056557
§ 371 (c)(1),
(2) Date: Apr. 19, 2017

(87) PCT Pub. No.: WO2016/064944
PCT Pub. Date: Apr. 28, 2016

(65) Prior Publication Data
US 2017/0320708 A1 Nov. 9, 2017

(30) Foreign Application Priority Data
Oct. 22, 2014 (CN) .......................... 2014 1 0564626

(51) Int. Cl.
*B66C 23/20* (2006.01)
*F16J 13/20* (2006.01)
(Continued)

(52) U.S. Cl.
CPC ........ *B66C 23/203* (2013.01); *E02D 29/1463* (2013.01); *F16J 13/20* (2013.01); *B60H 1/323* (2013.01)

(58) Field of Classification Search
CPC . B66C 23/203; B66C 23/208; E02D 29/1463; F16J 13/20
See application file for complete search history.

(56) References Cited

U.S. PATENT DOCUMENTS 2,510,394 A * 6/1950 Fong ..................... A01K 97/16
242/404.2
3,168,260 A * 2/1965 Kittelson ............. B65H 54/585
242/404.2
(Continued)

FOREIGN PATENT DOCUMENTS

| CN | 101825176 A | 9/2010 |
| CN | 103883595 A | 6/2014 |

(Continued)

OTHER PUBLICATIONS

Carrier Corporation, "High-Efficiency Hermetic Centrifugal Liquid Chiller", Evergreen Chillers, Form 19XR-9PD, available at: http://www.carriercca.com/pdf/products_pdf/product_data_19XR_en.pdf, May 21, 2010, 48pgs.
(Continued)

*Primary Examiner* — Michael E Gallion
(74) *Attorney, Agent, or Firm* — Cantor Colburn LLP

(57) ABSTRACT

A flange cover mounting and dismounting device, which comprises: a base part, comprising a fastener element with a fastener hole array, and being fastened on a flange cover mounting surface by the fastener hole array; and a jib arm assembly, having a first end being pivotally connected to the fastener element, and a second end being connected to the flange cover. The flange cover mounting and dismounting device can be fixed to the flange cover mounting surface having a corresponding fastener hole array, which is convenient for mounting and dismounting a flange cover. In addition, under most circumstances, the fastener hole array on the flange cover mounting surface is intrinsically owned
(Continued)

by the devices, which originally can be applied to connect modules of each device or used for other applications.

8 Claims, 3 Drawing Sheets

(51) Int. Cl.
  *E02D 29/14* (2006.01)
  *B60H 1/32* (2006.01)

(56) References Cited

U.S. PATENT DOCUMENTS

| | | | |
|---|---|---|---|
| 4,398,649 A | 8/1983 | Labbe | |
| 4,519,519 A | 5/1985 | Meuschke et al. | |
| 4,865,513 A | 9/1989 | Norris | |
| 5,617,963 A * | 4/1997 | Baziuk | B66C 23/208 212/179 |
| 5,732,733 A * | 3/1998 | Negus | B65H 75/38 137/315.01 |
| 5,950,368 A | 9/1999 | Bradford | |
| 5,988,559 A * | 11/1999 | Gnass | B65H 54/585 242/395 |
| 6,042,330 A * | 3/2000 | Egan | A61G 7/1017 212/237 |
| 6,135,300 A * | 10/2000 | Fox | B66C 23/208 182/60 |
| 6,446,307 B2 | 9/2002 | Wilkins | |
| 6,454,117 B1 | 9/2002 | Pysher et al. | |
| 6,715,715 B1 | 4/2004 | Petersen | |
| 7,127,849 B1 | 10/2006 | Gayer | |
| 7,341,398 B2 | 3/2008 | Johnson et al. | |
| 7,533,778 B1 | 5/2009 | Staples | |
| 7,556,160 B2 | 7/2009 | Porebski et al. | |
| 7,731,145 B2 | 6/2010 | Wolfford | |
| 7,810,671 B2 | 10/2010 | Depietro | |
| 7,908,710 B2 | 3/2011 | Monneret et al. | |
| 7,931,168 B2 | 4/2011 | Depietro et al. | |
| 8,206,058 B2 | 6/2012 | Vrondran et al. | |
| 9,217,535 B1 * | 12/2015 | Egan | A61G 3/02 |
| 9,434,582 B2 * | 9/2016 | Arthur | B66C 23/00 |
| 9,802,800 B2 * | 10/2017 | Kalakay, Jr. | B66D 3/26 |
| 9,902,589 B2 * | 2/2018 | Gregory | B65H 75/446 |
| 2005/0161422 A1 * | 7/2005 | Boily | A62B 1/08 212/177 |
| 2005/0242051 A1 * | 11/2005 | Porebski | B66C 23/203 212/179 |
| 2006/0219649 A1 | 10/2006 | Wolfford, Sr. | |
| 2009/0132097 A1 | 5/2009 | Sharma et al. | |
| 2013/0081048 A1 | 3/2013 | Kobayashi et al. | |
| 2013/0092781 A1 * | 4/2013 | Gregory | B65H 75/446 242/404 |
| 2013/0178999 A1 | 7/2013 | Geissler et al. | |
| 2014/0264213 A1 * | 9/2014 | Nipper | B66C 23/203 254/390 |
| 2016/0096710 A1 * | 4/2016 | Hanley | B66D 1/60 254/332 |

FOREIGN PATENT DOCUMENTS

| | | |
|---|---|---|
| CN | 203696397 U | 7/2014 |
| JP | 2665498 B2 | 10/1997 |
| WO | 2011010119 A1 | 1/2011 |

OTHER PUBLICATIONS

International Search Report and Written Opinion for application PCT/US2015/056554, dated Dec. 23, 2015, 12pgs.
Chinese First Office Action and Search Report for application CN 201410564626.5, dated Aug. 23, 2018, 6 pages.

\* cited by examiner

FLANGE COVER MOUNTING AND DISMOUNTING DEVICE AND COOLING DEVICE

TECHNICAL FIELD

The present invention relates to the field of a device for mounting and dismounting a part, and more particularly to a flange cover mounting and dismounting device.

BACKGROUND

Currently, for most large scale equipment, especially large scale cooling equipment, the process of mounting and dismounting a flange cover is rather complicated. Generally, the position and weight of the flange cover in such equipment decide that the flange cover cannot be mounted and dismounted manually. Instead, it shall be mounted and dismounted by using a tool such as a hanging pillar. Unfortunately, some fragile parts may be disposed surrounding the flange cover, or the flange cover may be interfered with some other parts. Thus, during the overall process of hanging, mounting, and dismounting, it shall pay a special attention to a running route of the hanging pillar. For example, in some large scale horizontal-type coolers, when a flange cover is mounted and dismounted, a conventional vertical-lifting hanging pillar is used to lift the flange cover upwards, it may crash some other parts, and result in damages of the parts, which may even cause security accidents, if serious. In contrast, if a conventional horizontal-rotating hanging pillar is used to lift the flange cover, on one hand, it is difficult to figure out an exact fixing position, and on the other hand, it needs to be adjusted in many factors such as height, length, and so on, to cater to coolers with different sizes, which is extremely complicated and not convenient for operation.

SUMMARY OF THE INVENTION

An object of the present invention is to provide a flange cover mounting and dismounting device, which can be easily mounted and widely applied.

According to an aspect of the present invention, the present invention provides a flange cover mounting and dismounting device, which comprises: a base part, comprising a fastener element with a fastener hole array, and being fastened to a flange cover mounting surface by the fastener hole array; and a jib arm assembly, being pivotally connected to the fastener element.

Optionally, the base part further comprises: an adjusting element, connected with the fastener element, and used for clamping the flange cover mounting surface from edges of the flange cover mounting surface.

Optionally, the adjusting element comprises a fixing mechanism and a clamping mechanism that can move relative to each other. The fixing mechanism is connected with the fastener element; and the clamping mechanism clamps the flange cover mounting surface from edges of the flange cover mounting surface.

Optionally, the fixing mechanism is an L-shaped bracket. One side of the L-shaped bracket is connected with the fastener element, and the other side of the L-shaped bracket is disposed with a sliding chute extending along a length direction thereof. The clamping mechanism moves relative to the fixing mechanism along the sliding chute.

Optionally, the fastener element comprises: a first mounting plate with the fastener hole array; an upper plate and a lower plate, respectively extending from two ends of the first mounting plate and bending towards the same side; and a sleeve, disposed between the upper plate and the lower plate.

Optionally, a side wall on a lower part of the sleeve is disposed with an oil hole for a lubricating oil to pass through.

Optionally, the jib arm assembly comprises: a support pillar, a swing arm, and a lifting lever. The support pillar is pivotally connected to the fastener element. The swing arm is connected to the support pillar, and is pivotally rotated about the support pillar. The lifting lever moves along a length direction of the swing arm, and is connected to a flange cover to be mounted and dismounted.

Optionally, the jib arm assembly further comprises a cover plate disposed with a first limiting mechanism, the cover plate is placed surrounding the support pillar, and fixed on the fastener element. The swing arm is disposed with a second limiting mechanism matching with the first limiting mechanism.

Optionally, the flange cover mounting and dismounting device is used for mounting and/or dismounting a flange cover matching with a device to be mounted and dismounted.

According to another aspect of the present invention, the present invention further provides a cooling device, which comprises a flange cover and a flange cover mounting surface. A fastener hole array is disposed on the flange cover mounting surface. The fastener hole array on the flange cover mounting surface is matched with the fastener hole array on the flange cover mounting and dismounting device as mentioned above.

Optionally, the fastener hole array on the flange cover mounting surface is three holes in a staggered arrangement.

The flange cover mounting and dismounting device according to the present invention can be fixed to the flange cover mounting surface having a corresponding fastener hole array by means of a fastener hole array, which is convenient for mounting and dismounting a flange cover. In addition, under most circumstances, the fastener hole array on the flange cover mounting surface is intrinsically owned by the devices, which originally can be applied to connect modules of each device or used for other applications. Therefore, the flange cover mounting and dismounting device provided in the present invention not only has a mounting and dismounting function, but also has advantages such as being easily mounted, being widely applied, and so on.

DETAILED DESCRIPTION

Figure 1:
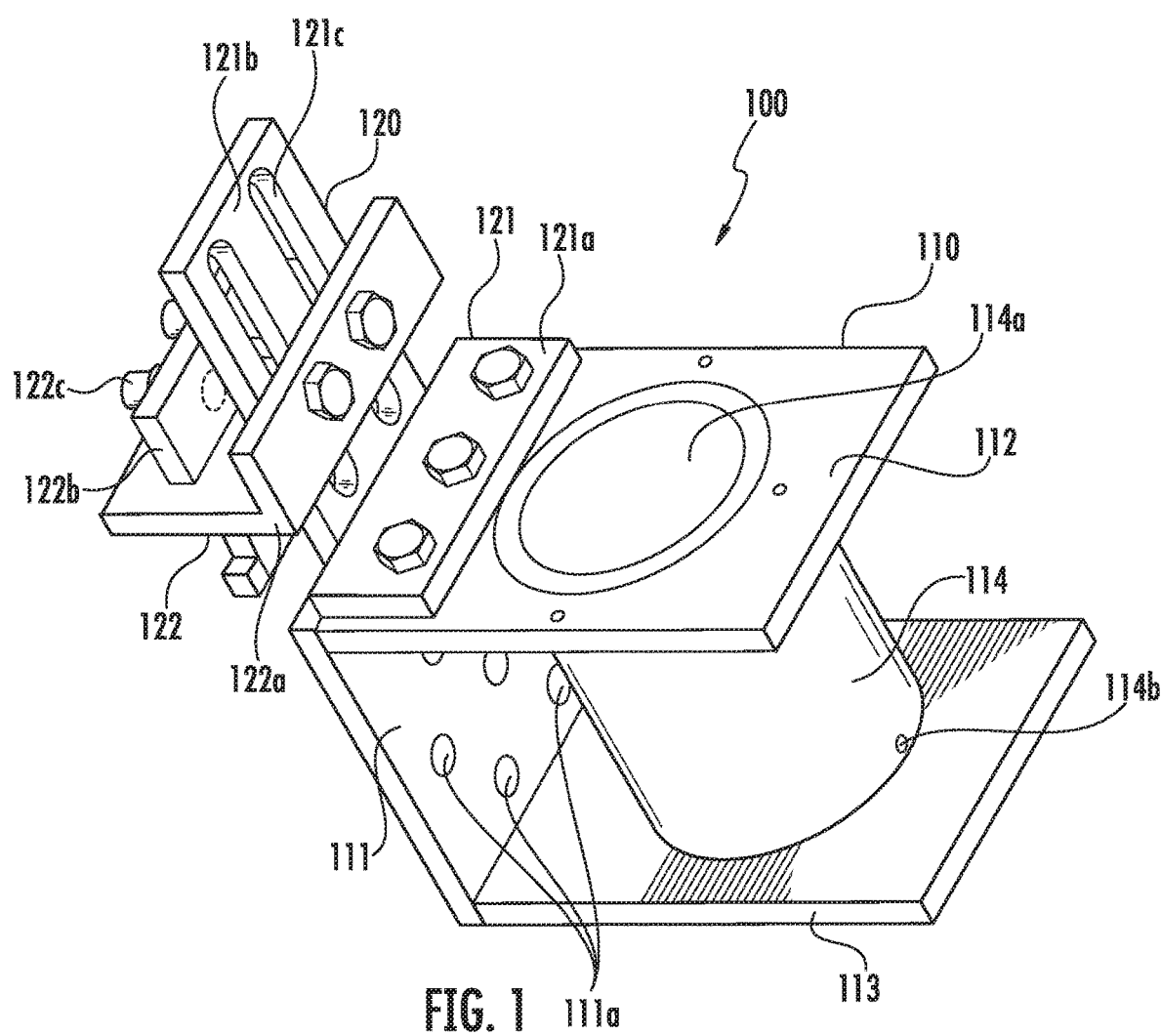
FIG. 1 is a schematic structural view of a base part according to an embodiment of the present invention.

FIG. 1 shows a base part 100 of the present invention, which comprises a fastener element 110 and an adjusting element 120. The fastener element 110 is made of a bent board material. For example, the fastener element 110 comprises: a first mounting plate 111; and an upper plate 112 and a lower plate 113 respectively extending from two opposite ends on the first mounting plate 111 towards the same side and bending towards the same side. Optionally, the upper plate 112 and the lower plate 113 respectively form an angle of 90 degrees with the first mounting plate 111, thereby forming a more stable structure. In addition, the first mounting plate 111 is disposed with a fastener hole array 111a. The fastener hole array 111a shall have a corresponding distribution manner with respect to a flange cover mounting surface to be mounted and dismounted, so that the fastener element 110 can be fixed to a device to be mounted and dismounted. Optionally, fastener holes on the fastener hole array 111a can present a plurality of combinations, to cater to the circumstances that different devices to be mounted and dismounted have fastener holes scattered with different spaces or different distributions, thereby greatly enhancing an application scope of the device of the present invention. In addition, the upper plate 112 and the lower plate 113 are respectively disposed with round openings, for mounting a sleeve 114 with a corresponding size. The sleeve 114 has a first opening 114a at a position connecting with the upper plate 112, for accommodating the jib arm assembly that can be matched correspondingly. Optionally, the jib arm assembly 114b is further disposed with an oil hole 114b, so that the jib arm assembly can be pivotally rotated stably under effects of a lubricating oil.

The adjusting element 120 comprises a fixing mechanism 121 and a clamping mechanism 122. The fixing mechanism 121 is an L-shaped bracket having a first edge 121a and a second edge 121b. The first edge 121a is disposed with a bolt hole, and is fixed on the fastener element 110 by using a bolt. Optionally, the first edge 121a is fixed on the upper plate 112, and does not shield the first opening 114a of the sleeve 114. The second edge 121b is placed in parallel with the first mounting plate 111, and is disposed with a sliding chute 121c thereon. The clamping mechanism 122 comprises a first clamping element 122a and a second clamping element 122b. The first clamping element 122a is also an L-shaped element, and is disposed with a bolt hole on one edge thereof, and this edge is disposed in parallel with the second edge 121b of the fixing mechanism 121, whereas the other edge thereof is perpendicular to the second edge 121b of the fixing mechanism 121, and is further disposed with a groove for the second edge 121b of the fixing mechanism 121 to move up and down. The second clamping element 122b is similarly disposed with a bolt hole. A first fastening bolt 122c can sequentially pass through the second clamping element 122b, the sliding chute 121c on the second edge 121b of the fixing mechanism 121, and the first clamping element 122a, and fasten them together. Before the fastening operation, the first clamping element 122a and the second clamping element 122b can be moved up and down with respect to the second edge 121b of the fixing mechanism 121, thereby catering to flange cover mounting surfaces with different sizes.

In the base part 110, the fastener element 110 is used to be fixed to a mounting surface of a flange cover to be mounted and dismounted by the fastener hole array 111a. The adjusting element 120 is used to clamp the flange cover mounting surface to further enhance the fastening effects. Meanwhile, the adjusting element 120 can be adjusted up and down and front and back respectively, to cater to flange cover mounting surfaces with different sizes and different thicknesses. In this way, the mounting and dismounting device of the present invention can be more widely applied. Thus, it does not need to design different mounting and dismounting devices for equipment with different sizes and different models respectively, thereby greatly reducing the cost.

Figure 2:
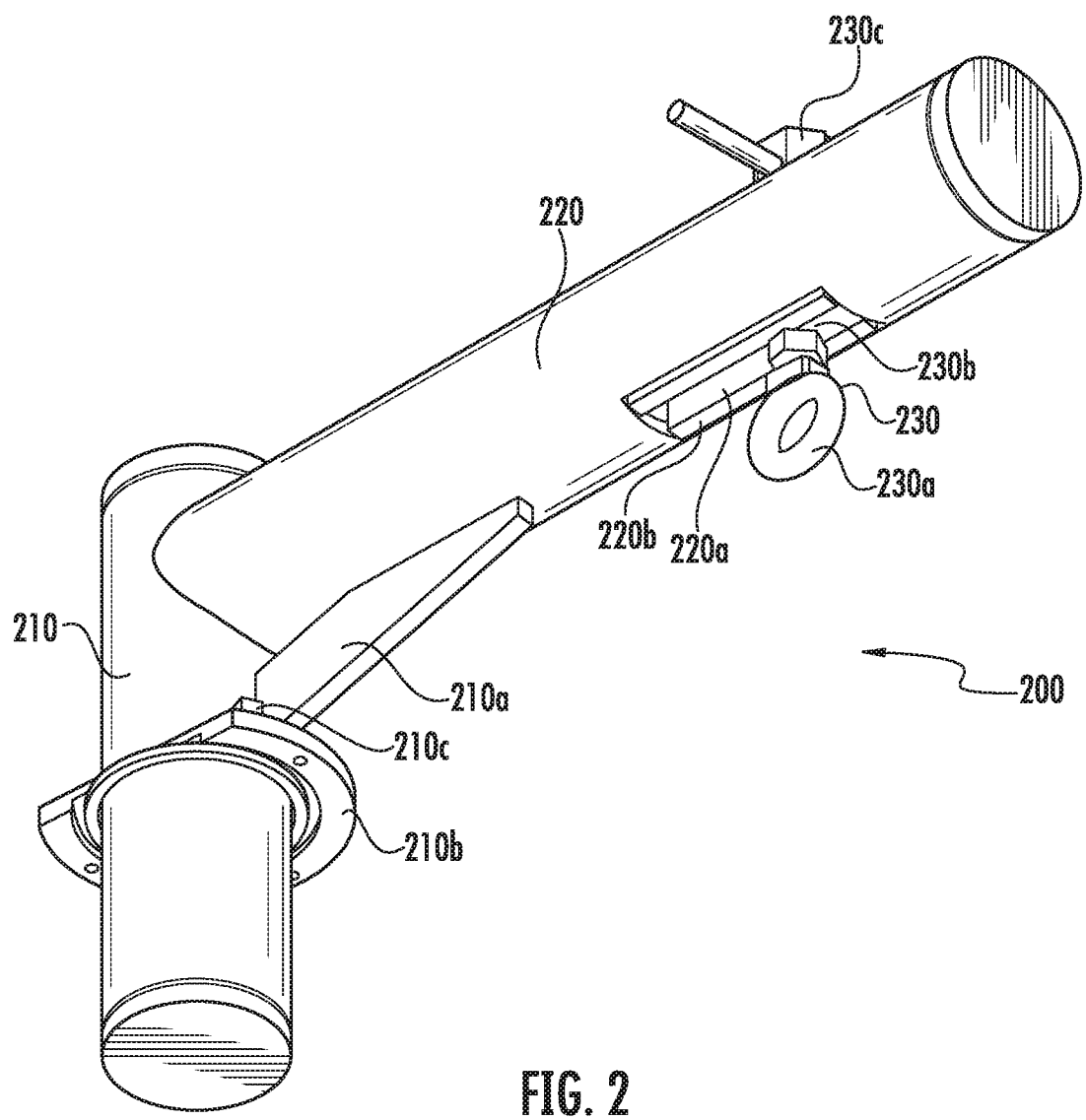
FIG. 2 is a schematic structural view of a jib arm assembly according to an embodiment of the present invention.

FIG. 2 shows a jib arm assembly 200 matching with the base part 100 according to the present invention. The jib arm assembly 200 comprises a support pillar 210, a swing arm 220, and a lifting lever 230. The support pillar 210 can be pivotally connected to the fastener element 110 of the base part 100. At a position where the support pillar 210 is matched with the upper plate 112 of the fastener element 110, a cover plate 210b is placed surrounding the support pillar 210, and the cover plate 210b is fixed on the upper plate 112. One end of the support pillar 210 is inserted into the first opening 114a of the fastener element 110, and the other end of the support pillar 210 is disposed with the swing arm 220. The swing arm 220 is disposed with a second opening 220a along a length direction, so as to allow the lifting lever 230 to move back and forth therein. Furthermore, the second opening 220a is disposed with two clamping boards 220b therein, to fix the lifting lever 230 at a proper lifting position. The lifting lever 230 is formed by a hanging ring 230a, a lever 230b, and a second fastening bolt 230c. The hanging ring 230a can be used for connecting a cable, and further connecting to a flange cover to be mounted and dismounted. The second fastening bolt 230c is used for fastening the whole lifting lever 230.

Optionally, in order to maintain the jib arm assembly 200 within a certain pivotally rotating angle, to avoid crashing between parts, a limiting mechanism may be further disposed to meet the above requirements. For example, a limiting bump 210c is disposed on the cover plate 210b, and a limiting board 210a is disposed on the support pillar 210. By means of the matching effects between the limiting bump 210c and the limiting board 210a, the pivotally rotating motion of the jib arm assembly 200 is restricted.

It shall be noted that, many mature jib arm assemblies are provided in the prior art, and as long as the jib arm assembly can be matched with the base part 100 of the present invention, it can similarly constitute the flange cover mounting and dismounting device of the present invention.

Figure 3:
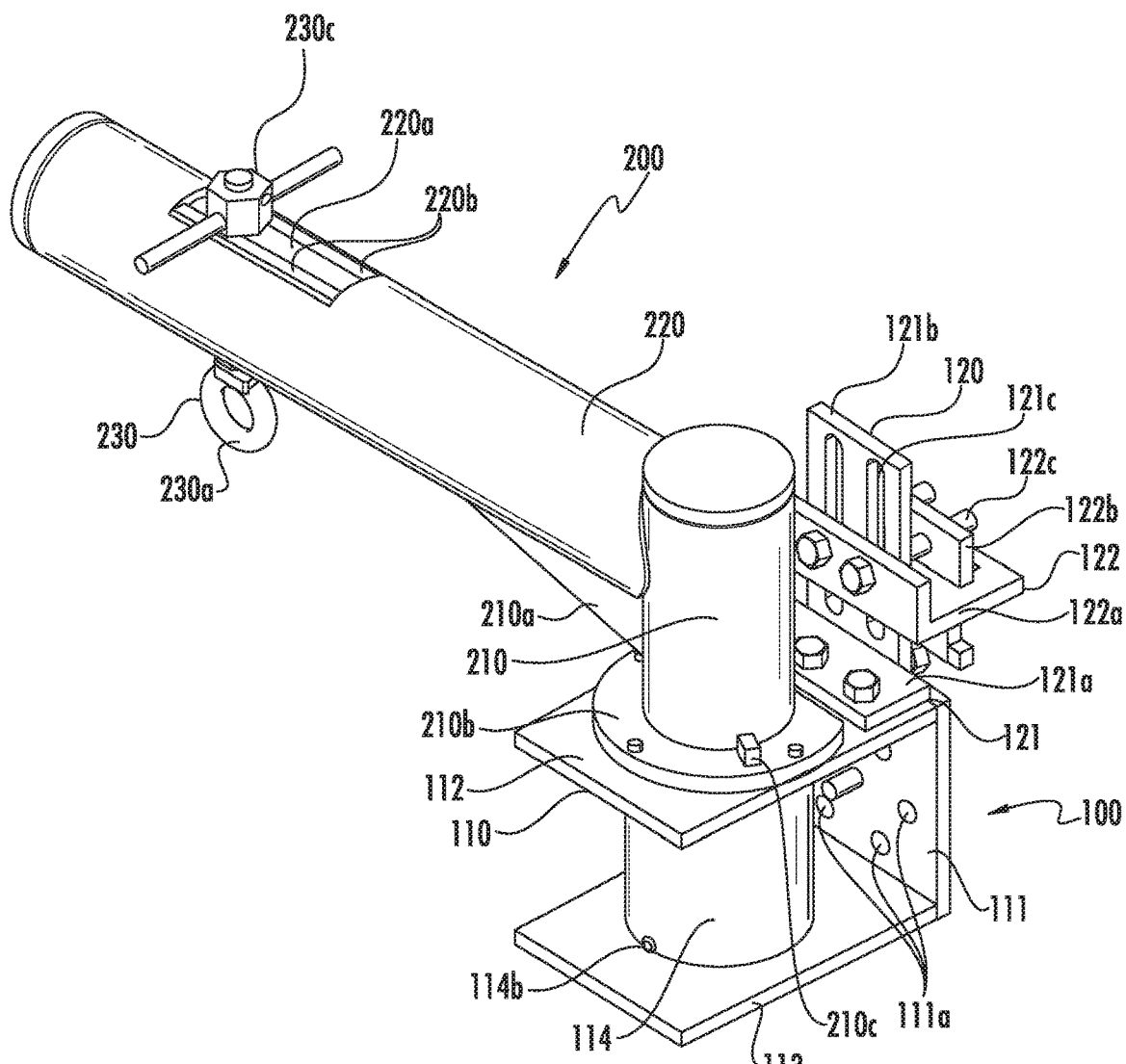
FIG. 3 is a schematic structural view for assembling a flange cover mounting and dismounting device according to an embodiment of the present invention.
Figure 4:
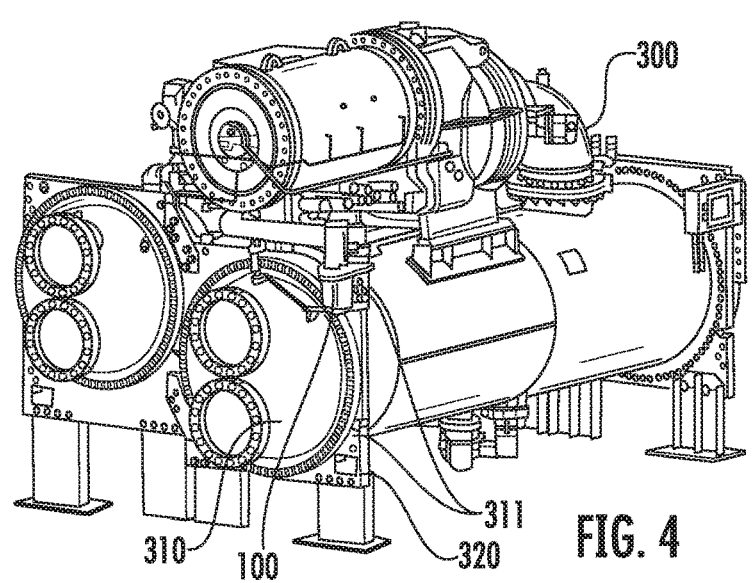
FIG. 4 is a schematic view of a flange cover mounting and dismounting device when being applied in a certain cooling device according to an embodiment of the present invention.

FIG. 3 and FIG. 4 respectively show a flange cover mounting and dismounting device according to an embodiment of the present invention and their application on a cooling device 300. The flange cover mounting and dismounting device only comprises a base part 100 (comprising a fastener element 110 and an adjusting element 120) and a jib arm assembly 200, so that it is very convenient for assembling, dismounting, and carrying, thereby avoiding a security problem during the above processes. When the flange cover mounting and dismounting device is carried to the cooling device 300 to be mounted and dismounted (for example, in this embodiment, a flange cover 320 in the cooling device needs to be dismounted), the fastener hole array 110a of the fastener element 110 is aligned and fastened with a fastener hole array 311 at a corresponding position on the flange cover mounting surface 310, thereby fixing the fastener element 110. The fastener holes on the fastener hole array 110a present a plurality of combinations. By means of a different fastener hole on the fastener hole array 110a, a fixing position between the fastener element 110 and the flange cover mounting surface 310 can be altered back and forth and left and right, thereby enhancing its application scope. Subsequently, the fixing mechanism 121 in the adjusting element 120 is fixed to the upper plate 112 of the fastener element 110, and the clamping mechanism 122 is adjusted up and down to cater to the changing of a distance between the fastener hole array 311 on the flange cover mounting surface and edges of the flange cover mounting surface. After the adjusting process is completed, the first fastening bolt 122c is screwed tightly, thereby sequentially fastening the second clamping element 122b, the flange cover mounting surface, the fixing mechanism 121, and the first clamping element 122a. In this way, it can further enhance the fixing effects between the whole base part 100 and the flange cover mounting surface. Then, the jib arm assembly 200 is mounted on the base part 100, thereby completing the assembling of the whole device.

After the device for dismounting the flange cover is assembled and fixed, the flange cover in the cooling device is connected to the hanging ring 230a of the lifting lever 230 by means of a cable, and the lifting lever 230 is moved along a length direction of the swing arm 220, so as to be adjusted to a most proper lifting position. Then, the fastening bolts at the edges of the flange cover are all dismounted, and then, the swing arm 220 is rotated to open and lift the flange cover, thereby dismounting the flange cover. Considering the mounting process of the flange cover, similar steps can be used. Such mounting and dismounting operations can effectively avoid the problem that several parts may be crashed with the flange cover when the flange cover is lifted vertically.

In addition, the flange cover mounting and dismounting device of the present invention can also be applied to mount and/or dismount the flange cover of other devices to be mounted and/or dismounted. When such device is laid down horizontally, or when the flange cover of such device to be mounted and dismounted needs to be mounted or dismounted with respect to the device to be mounted and dismounted along a horizontal direction, the flange cover mounting and dismounting device of the present invention has greater advantages. For example, the flange cover mounting and dismounting device has a more proper fixing surface; and drives the jib arm assembly to pivotally rotate along a horizontal direction, thereby avoiding crashing various other parts and elements distributed in the perpendicular direction, and enhancing the security level.

Still referring to FIG. 4, the present invention further provides a cooling device 300, which comprises a flange cover 320 and a flange cover mounting surface 310. Fastener hole arrays 311 are further disposed at a position close to edges of the flange cover mounting surface 310. Optionally, when the flange cover mounting surface is rectangular, the fastener hole arrays 311 are disposed at positions close to four angles of the flange cover mounting surface 310. The fastener hole arrays herein can be used for connecting and fixing a plurality of modules with the same type in the cooling device; and meanwhile can be matched with the fastener hole array 111a in the flange cover mounting and dismounting device as mentioned in the above embodiments. Optionally, the fastener hole array is three holes placed alternatively, which may form a plurality of combinations with the fastener hole array 111a in the flange cover mounting and dismounting device, thereby convenient for moving the device for dismounting the flange cover.

It should be noted that, the terms of "up", "down", "front", and "back" and so on mentioned in the present invention are merely used to describe the conventional placing modes when the mounting and dismounting device in this embodiment is used for mounting and dismounting, which, however, are not definitely used, as long as it can fulfill each functions as described in the present invention and have the structure as mentioned in the above detailed description.

The detailed description in the present invention have been described above in great detail with reference to the accompanying drawings. Persons skilled in the art can make similar modifications or variations on the detailed features in the embodiments, which undoubtedly fall within the protection scope of the claims.

The invention claimed is:

1. A flange cover mounting and dismounting device, comprising:
   a base part, comprising a fastener element with a fastener hole array, and being fastened to a flange cover mounting surface by the fastener hole array and an adjusting element, connected with the fastener element; and
   a jib arm assembly, being pivotally connected to the fastener element;
   wherein the adjusting element comprises a fixing mechanism and a clamping mechanism that can move relative to each other;
   the fixing mechanism is connected with the fastener element; and
   the clamping mechanism clamps the flange cover mounting surface from edges of the flange cover mounting surface, the clamping mechanism comprising a first clamping element and a second clamping element coupled by a fastening bolt;
   wherein the fixing mechanism comprises an L-shaped bracket, one side of the L-shaped bracket is connected with the fastener element, and the other side of the L-shaped bracket is disposed with a sliding chute extending along a length direction thereof and the clamping mechanism moves relative to the fixing mechanism along the sliding chute;
   wherein the fastening bolt passes through the first clamping element, the sliding chute and the second clamping element.

2. The flange cover mounting and dismounting device of claim 1, wherein the fastener element comprises: a first mounting plate with the fastener hole array; an upper plate and a lower plate, respectively extending from two ends of the first mounting plate and bending towards the same side; and a sleeve, disposed between the upper plate and the lower plate.

3. The flange cover mounting and dismounting device of claim 2, wherein a side wall on a lower part of the sleeve is disposed with an oil hole for a lubricating oil to pass through.

4. The flange cover mounting and dismounting device of claim 1, wherein the jib arm assembly comprises: a support pillar, a swing arm, and a lifting lever; the support pillar is pivotally connected to the fastener element, the swing arm is connected to the support pillar, and is pivotally rotated about the support pillar; and the lifting lever moves along a length direction of the swing arm, and is connected to a flange cover to be mounted and dismounted.

5. The flange cover mounting and dismounting device of claim 4, wherein the jib arm assembly further comprises a cover plate disposed with a first limiting mechanism, the cover plate is placed surrounding the support pillar, and fixed on the fastener element; and the swing arm is disposed with a second limiting mechanism matching with the first limiting mechanism.

6. A flange cover mounting and dismounting device of claim 1, wherein the flange cover mounting and dismounting device is used for mounting and/or dismounting a flange cover matching with a device to be mounted and dismounted.

7. A cooling device, comprising a flange cover and a flange cover mounting surface, wherein a fastener hole array is disposed at a position close to edges of the flange cover mounting surface, and the fastener hole array on the flange cover mounting surface is matched with a fastener hole array on the flange cover mounting and dismounting device of claim 1.

8. The cooling device of claim 7, wherein the fastener hole array on the flange cover mounting surface is three holes in a staggered arrangement.

* * * * *